April 30, 1940. G. DEGRELLE 2,198,864
AGRICULTURAL MACHINE
Filed Feb. 23, 1938 3 Sheets-Sheet 3
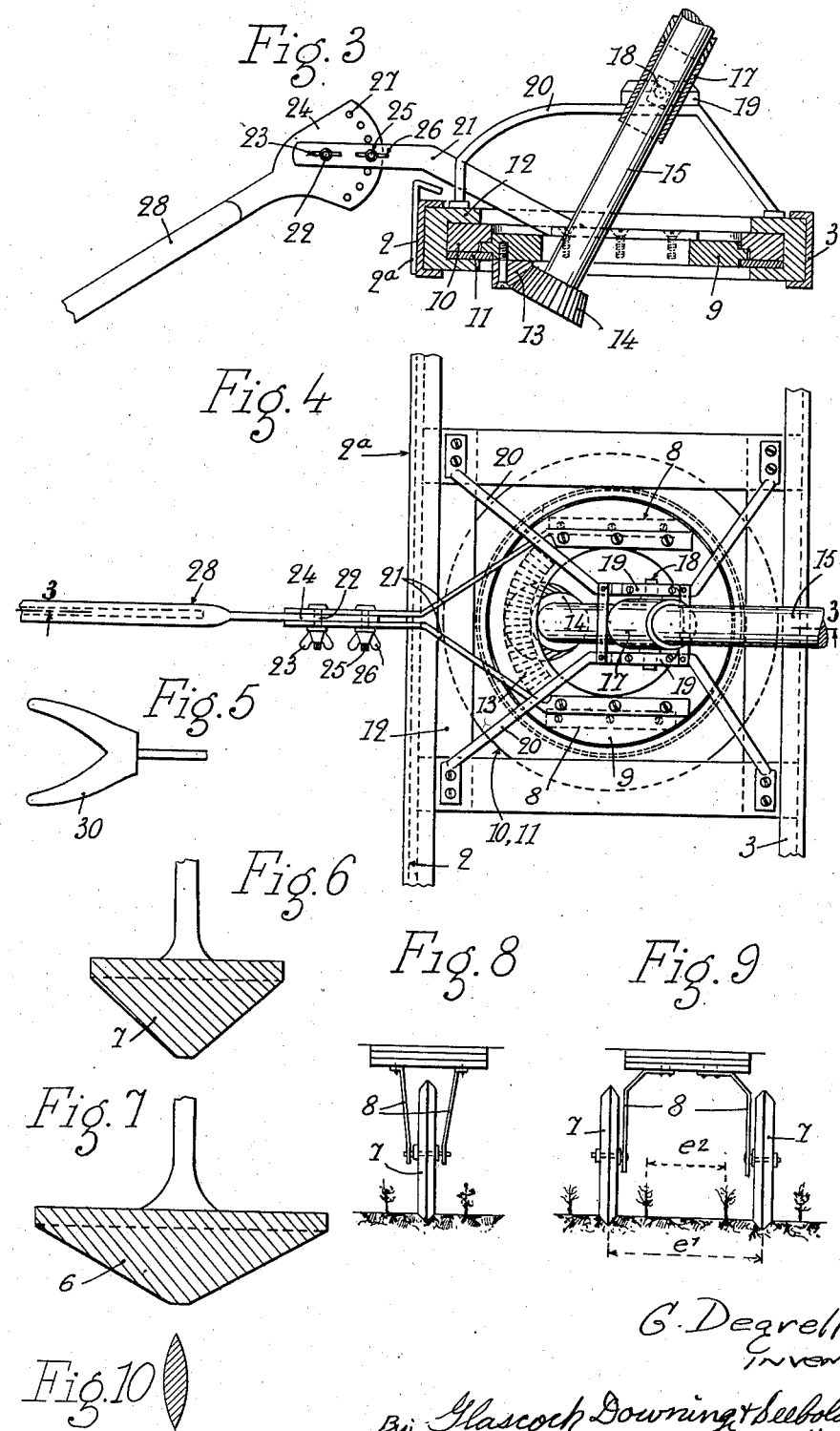

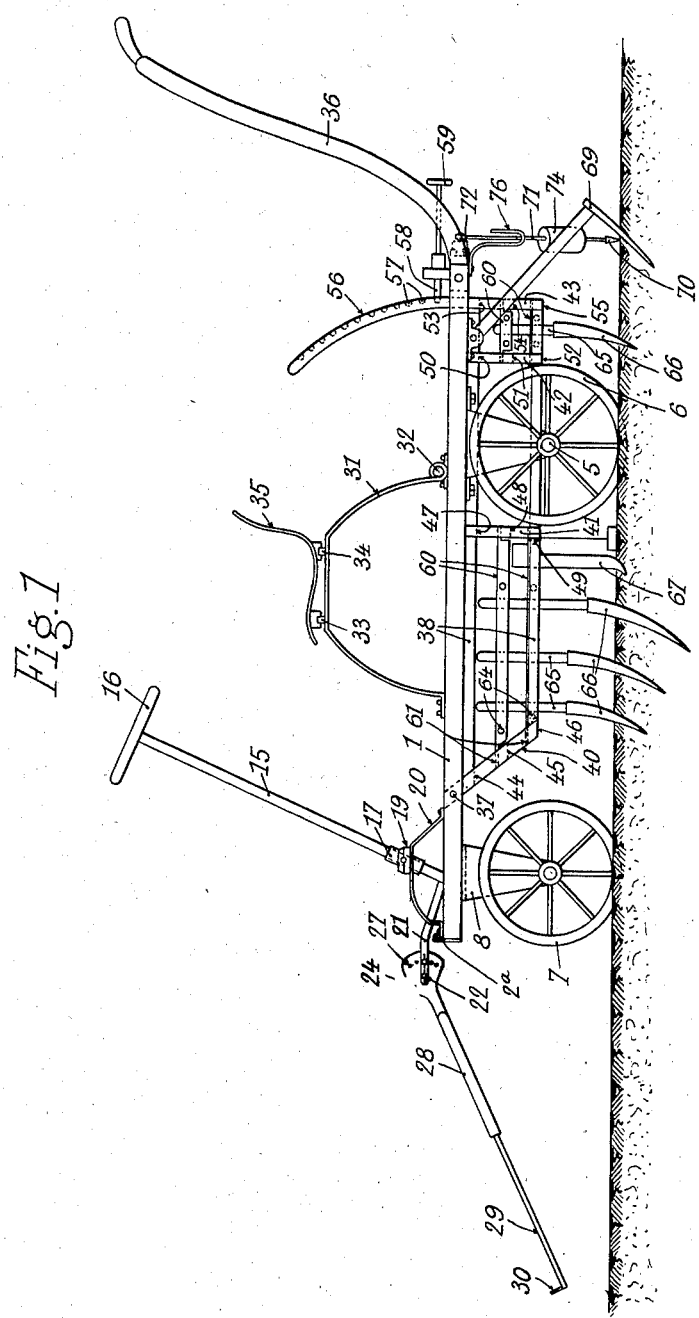

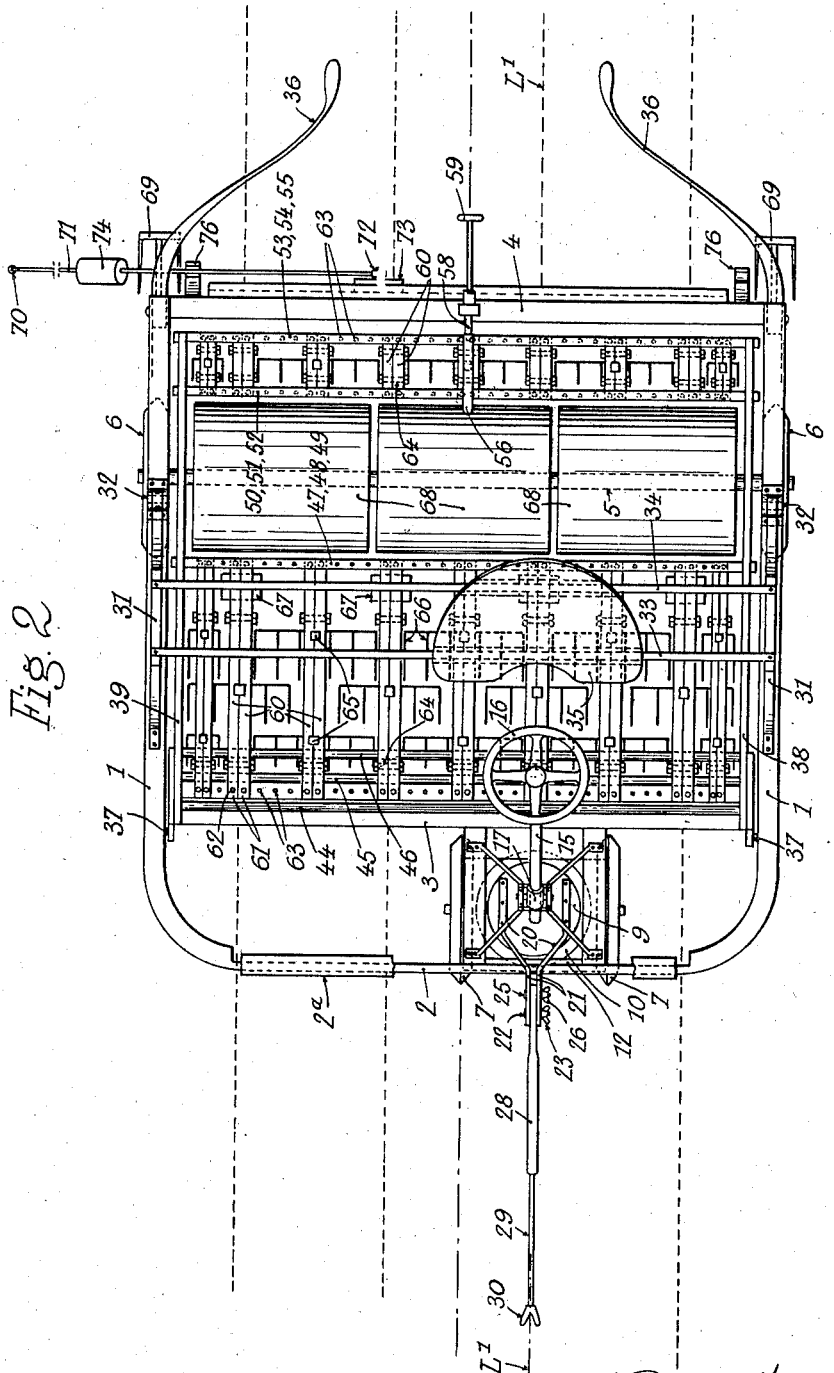

Patented Apr. 30, 1940

2,198,864

UNITED STATES PATENT OFFICE 2,198,864

AGRICULTURAL MACHINE

Georges Degrelle, Marcq en Baroeul, Nord, France

Application February 23, 1938, Serial No. 192,174
In France March 9, 1937

4 Claims. (Cl. 97—233)

The present invention relates to a machine which permits of performing, in a single passage and on a certain number of lines or rows, various agricultural operations which have hitherto required several passages with machines of different types and operating, as a rule, upon one row at a time.

The said machine is chiefly characterized by the fact that it is provided, at the front part, with a sighting device, the position of which is adjustable with reference to the lines of cultivation and with reference to the wheels of the machine and the tools which it carries, in such way that it will suffice, during the displacement of the machine, to maintain the said sighting device upon a given line (line of plants, furrow, cord etc.) in order that the tools and the wheels of the machine shall move between the rows of seeding, of plants, etc., according to lines which are always exactly parallel to the said rows.

This will afford a most approved passage of the tools between the rows of seeding, of plants, etc., even in close proximity to the said rows and without any danger of contact with the latter.

The machine will thus perform various operations which are successive, rapid and exact, between the rows of plants, and quite close to the plants without any risk of damage to the same.

According to another characteristic of the invention, the machine comprises an auxiliary frame carrying supports which are transversely adjustable, each of which is adapted to receive one or more tools which can thus readily be placed in the lateral direction according to the spacing between the various lines of cultivation, and also in the lengthwise direction according to the successive operations to be performed during a given passage of the machine.

Further characteristics will be set forth in the following description.

In the accompanying drawings, which are given solely by way of example:

Fig. 1 is a diagrammatic elevational view of a machine in conformity to the invention.

Fig. 2 is a corresponding plan view.

Fig. 3 is a vertical section, on a larger scale, on the line 3—3 of Fig. 4, of the front steering wheel set, its controlling device, and the sighting device secured to the same.

Fig. 4 is a corresponding plan view.

Fig. 5 is a plan view of the sighting device.

Figs. 6 and 7 are cross sections of wheel rims which may be advantageously used.

Fig. 8 is a diagrammatic front view of a front wheel set with a single wheel.

Fig. 9 is a modification of this wheel set, comprising two wheels.

Fig. 10 is a section of a tooth of a tool adapted for use in the machine.

In the embodiment herein represented, the machine comprises a rigid frame consisting of two side bars 1 (Figs. 1 and 2) which are connected together at the front by two cross-pieces 2 and 3, and in the rear by a cross-piece 4.

The said frame rests in the rear upon an axle 5 mounted upon two wheels 6 which have preferably a variable spacing and the rim of which may be flat, but will have preferably a triangular or like section, as shown in Fig. 7, by which it will trace upon the ground a furrow adapted to guide the machine on the next trip.

The machine may be drawn directly or by cable or by means of an engine or motor, and in the respective cases, the wheels 6 are loose wheels or driving wheels.

In the front part, the frame rests upon one or two steering wheels 7. Such wheels (Fig. 8 or 9) have preferably a rim of triangular section (Fig. 6) and are mounted on one or two side-plates 8 which are secured to a large ring 9 (Figs. 3 and 4).

In the case of two wheels, the spacing $e^1$ (Fig. 9) of the said wheels is so selected as to correspond practically to a multiple of the usual spacing $e^2$ between the lines or rows of plants.

The ring 9 carrying the wheel or wheels 7 is fitted upon its whole periphery into a ring in two parts 10 and 11, of U-section, in such way that the ring 9 can rotate on its vertical axis with reference to the members 10 and 11. The said members are fitted into a frame 12 which is slidable across the frame of the machine, and the cross-pieces 2 and 3 having a U-section, or the like, serve as guides for this purpose. The cross-piece 2 is provided preferably with a foot-rest 2ª (Figs. 1, 2 and 3).

The rotation of the ring 9 with reference to the fixed rings 10 and 11, which provides for the steering by the wheel or wheels 7, is effected for instance by the following device.

The ring 9 is provided (Figs. 3 and 4) with a sector 13 having bevelled teeth, cooperating with a pinion 14 which is keyed to the end of a steering tube 15 (Figs. 1 to 4) carrying at the top a steering wheel 16 or like steering device. The said tube 15 is rotatable in a sleeve 17 mounted on two trunnions 18 operating in respective bearings 19 which are secured by two supports 20 to the frame 12. By turning the said tube 15 about its trunnions 18, the steering wheel 16 can be readily moved towards the front in order to give access to the top part of the machine.

To the ring 9 are rigidly secured two fittings 21, the parallel front ends of which form a forked device adapted for the pivoting, by means of a bolt 2 and a nut 23, of a sector 24, the angular position of which can be regulated by means of a bolt 25 with nut 26, adapted for insertion through any one of a set of holes 27 in the sector 24. On the end of the said sector is mounted an arm 28 which is tubular upon the whole or a part of its length, and a solid or hollow rod 29 (Figs. 1 and 2) is adapted to slide in said arm and to be regulated in position. At the end of the said rod 29 is mounted a member 30 (Figs. 1, 2, 5) having the form of a V or the like, which is used as a sighting device and may be painted in white or in red in order to make a contrast with the ground or the plants.

It will be observed that by adjusting the length of the telescoping arm 28 and 29, and also of its position about the axis 22, the sighting device 30 can be brought to the desired distance from the ground, and for instance, just above the level of the rows of plants, and when the rear wheels 6 are located between two rows of plants, the sighting device can be brought just above a line $L^1$ (Fig. 2) of the plants or above any other line marked on the ground, such as a furrow, a cord, or the like, by the displacement of the whole front part of the machine by sliding this part in the guides consisting of the cross-pieces 2 and 3.

To the frame of the machine are secured, by means of two supports 31 (Figs. 1 and 2) which are preferably hinged in the rear at 32, the cross-bars 33 and 34 adapted for the sliding movement of a seat 35, which can thus be readily brought adjacent the front part of the machine.

At the rear, two handles 36 are mounted on the frame, in order to facilitate the operating of the machine, for instance at the ends of the rows of plants.

An auxiliary frame or chassis is pivotally mounted, on the main frame, upon transverse journals 37 located at the front part, the said chassis consisting of two sets 38 and 39 of two side-bars, which are connected together by uprights 40, 41, 42, 43 and by cross-pieces 44 to 55. The said chassis is adjustable in height by oscillation about the axis of the journals 37, and it may thus be operated by hand or by any other suitable means. It may be held at the desired height by any suitable means, for instance by a curved piece 56 having notches 57 adapted for the engagement of a spring-bolt 58 which can be released by a handle 59, or the like, when it is desired to change the position of the auxiliary chassis.

Upon the sets of cross-pieces of said chassis 45, 48 and 46, 49, on the one hand, and 51, 54 and 52, 55 on the other hand, are mounted suitable pairs of bars 60. The said bars are secured by suitable means, and for instance by lugs 61, bolts 62 and nuts, in all desired transverse positions, by means of the series of holes 63 formed in the cross-pieces. The bars 60 may be pressed together by bolts 64 and nuts, or otherwise, in order to hold the shanks 65 of various tools 66 between them and thus to maintain them in all directions.

It will thus be observed that such tools can be suitably spaced, firstly as to the longitudinal direction of the machine, by moving their shanks 65 along the bars 60 which are slightly spaced apart by the said rods, except in the case in which they are provided with notches at intervals for receiving the said shanks; secondly, as to transverse position, by the proper choice of the sets of bars employed and of their transverse position on the cross-pieces.

As an example, tools which may be used and for which the mounting and the interchangeable conditions are provided in the interior of the frame, are as follows:

Sowing drills 67, which are preferably independent, that is, with one drill per line;

Weeding tools termed weed-hooks, which operate preferably on the bias and are employed for cutting off the weeds by a slanting drive;

Cultivators, or rods used for harrowing, which is the most important work of the machine; the teeth of said cultivators have advantageously a lenticular cross section, by which they are very strong and give but little resistance to traction (Fig. 10);

Hilling tools;

Pulling tools, which remove the earth next the roots or cut off the roots at one or two centimeters from the ground, so that after the passage of the machine it is simply necessary to pick up the vegetables, such as salads, spinach, corn-salad, etc.

The machine can also contain, between the cross-pieces 47, 48, 49 and 50, 51, 52, suitable rollers 68 which are loose on the axle 5 of the wheels 6.

Suitable tools 69 may also be mounted at the rear of the wheels 6.

The machine is completed by a tracing device adapted to trace on the ground a furrow parallel to the line $L^1$ (Fig. 2) at any desired distance from the line traced by the rear wheel on the right (or left) hand or from the line followed by the sighting device 30. The said tracing device consists of a pointed member 70 secured to the end of an arm 71 which may be plain or telescoping, and is pivoted at 72 to a slider 73 whose transverse position on the rear cross-piece 4 of the frame can be regulated. The arm 71 carries a weight 74 and is slidable in one or the other of two vertical guides 76 which are mounted on the frame in order to prevent the action of the ground on the tracer 70 causing the arm 71 to move to the rear.

The general method of use of the machine is as follows:

When it is necessary to perform a first series of operations on a given piece of ground which does not comprise rows of plants or of furrows, such as a seed-plot, the machine is moved over a first band of ground either by estimating, or by guiding, by means of the sighting device, upon a tracing cord. During this first passage, the tracer 70 will trace, laterally, a marking furrow. Upon reaching the end of the ground, the driver leaves his seat 35, and raises the rear part of the movable frame in order to remove the tools from the earth, and can lift up the sighting device 30 if desired. He then bears upon the handles 36 and acts as a counterweight in order to turn the machine within the smallest possible space. As the front part of the machine is now raised, the machine will pivot upon the rear wheels 6. The driver can thus place the said rear wheels upon the next line for starting. He then moves the front part so as to bring the sighting device 30 above the line formed by the tracer 70, and lowers the sighting device upon this line. He then brings the seat 35 adjacent the front part, and mounts upon this seat, and the machine is ready for another passage in the contrary direction to the first.

In order to prevent any encroaching upon the first passage, and also to prevent any departure from the latter, the driver steers the front wheels by the steering wheel 16, in such way that the sighting device 30 will always be exactly above the line formed by the tracer 70 during the preceding passage of the machine.

In the case of work to be done between existing rows of plants, the tracer 70 is no longer necessary, and the driver needs only hold the sighting device 30 upon a line of plants such as L¹, for instance, in order that the front and rear wheels and the tools may pass between these rows of plants if in the first place, the front axle set and with it the sighting device, the tools and the wheels have been properly placed according to the distance between the rows of plants and to their nature.

The machine according to the invention can be used for a great variety of operations, of which a certain number will be further indicated, by way of example.

The case is supposed to relate to a tilled soil, with an ordinary harrowing in order to break up the clods and to equalize the ground, and then rolling with the roller in order to obtain a uniform surface.

By a single passage, the machine according to the invention will perform the following operations.

1. A deep harrowing, with the use of a certain number of "cultivators" having different depths and provided with teeth having a lenticular cross section and mounted one back of the other in the movable frame. Thus the ground can be mellowed to 10, 15 or even 20 centimeters depth, and upon the whole width between the wheels.

2. A complete seeding upon a certain number of lines, with the seeds or grain covered. The drills will be placed at the rear of the last teeth of the cultivators.

3. A rolling of the ground after seeding, by means of the rollers 68. It is a known fact that the rolling is quite necessary for the proper growing of certain seeds, such as carrots and beets, whose seeds should be put into a properly mellowed ground, which is then tamped at the top.

4. A harrowing between the rows. It is supposed that carrots have been seeded in rows of 0.20 meter spacing. In the rear of the rollers is used a cultivator for 0.15 meter width width (with a depth of two or three fingers). The air and the sun will enter between the rows, of which only 5 centimeters will be practically rolled. Thus the carrot seed will be planted in the middle of this band of 5 centimeters.

In a single passage, four different operations have been performed, which complete one another and form a most approved combination.

A few weeks after, the plants have appeared. A second passage is then made with the machine exactly in the same lines of the wheels, which will have left their traces upon the ground. The front axle set is adjusted, by means of the sighting device, upon one of the rows of plants. The middle of the seat is placed in the same axis. The following operations are then performed on several lines, upon the width of the machine.

1. A removal of the weeds, which will have grown between the rows, with the "universal" weed-hooks, at about one centimeter depth.

2. A harrowing to five or six centimeters depth between the lines in order to mellow the ground which may have settled down owing to the rains. The roots of the weeds will be cut, and the harrowing will enable the air and the sun to again enter the ground, thus warming the soil and furthering the growth of the plants. When they have sufficiently grown, they will be thinned out in the rows.

Another passage of the machine will again afford a weeding and a harrowing, by the use of cultviators having fine teeth of lenticular section, which now enter the ground to a depth of eight or ten centimeters, thus effacing the traces of steps and furthering the growth. The traces of the wheels are then effaced by means of a cultivator mounted back of the wheels of the machine. During the growth, two or three passages with the machine fitted with the cultivators will insure an abundant group.

Another advantage of the machine is that it will provide for the cultivation of plants between certain other kinds of plants.

Obviously the invention is not limited to the embodiment herein described and represented, which is given solely by way of example.

Having now described my invention what I claim as new and desire to secure by Letters Patent is:

1. An agricultural machine comprising a rolling frame adapted to roll on the ground, at least one tool carried by said frame and adapted to operate on the ground, sighting means disposed at the front of the frame and adapted to indicate the direction of travel of the machine and means slidably mounting said sighting means in said frame for adjustment transversely thereof.

2. An agricultural machine according to claim 1, further comprising a seat for the driver which is slidably mounted in said frame in the transversal direction and is adapted to be brought in the alignment of said sighting means.

3. An agricultural machine comprising a frame, two rear wheels rotatably mounted on said frame about a horizontal axis at the rear of said frame, a front wheel carrier rotatably mounted on said frame about a substantially vertical axis, at least one wheel rotatably mounted on said carrier about a horizontal axis, controlling means adapted to rotate said carrier about said vertical axis, at least one tool carried by said frame and adapted to operate on the ground, and sighting means mounted on said carrier and projecting in front of said frame and adapted to indicate the direction of travel of the machine.

4. An agricultural machine as claimed in claim 1, characterized by the provision of a front wheel carrier rotatable about a substantially vertical axis at the front of said frame, controlling means adapted to turn said carrier about said vertical axis, said sighting means being mounted on said carrier.

GEORGES DEGRELLE.